United States Patent
Pettersen et al.

(10) Patent No.: US 9,972,980 B1
(45) Date of Patent: May 15, 2018

(54) BUSWAY PLUG INSPECTION WINDOW

(71) Applicant: Eaton Corporation, Cleveland, OH (US)

(72) Inventors: Gordon Stanley Pettersen, Greenwood, SC (US); Andrew Lester Frick, Greenwood, SC (US)

(73) Assignee: EATON CORPORATION, Cleveland, OH (US)

( * ) Notice: Subject to any disclaimer, the term of this patent is extended or adjusted under 35 U.S.C. 154(b) by 0 days. days.

(21) Appl. No.: 15/644,026

(22) Filed: Jul. 7, 2017

Related U.S. Application Data

(60) Provisional application No. 62/456,924, filed on Feb. 9, 2017.

(51) Int. Cl.
| | |
|---|---|
| *H01R 13/633* | (2006.01) |
| *H01R 13/713* | (2006.01) |
| *H01H 3/04* | (2006.01) |
| *H02B 1/20* | (2006.01) |
| *H01R 25/16* | (2006.01) |
| *H01R 13/68* | (2011.01) |
| *H01R 13/70* | (2006.01) |

(52) U.S. Cl.
CPC ............. *H02B 1/20* (2013.01); *H01R 13/68* (2013.01); *H01R 13/70* (2013.01); *H01R 25/162* (2013.01)

(58) Field of Classification Search
CPC .. H01R 13/717; H01R 25/142; H01R 13/633; H01R 13/713; H01H 3/04
USPC .......... 439/910, 121, 12, 116; 200/332, 335
See application file for complete search history.

(56) References Cited

U.S. PATENT DOCUMENTS

| | | | | |
|---|---|---|---|---|
| 4,097,103 A * | 6/1978 | Krause | ................... | H02G 5/007 174/88 B |
| 4,820,177 A * | 4/1989 | Slicer | ................... | H01R 25/161 439/114 |
| 5,145,403 A * | 9/1992 | Schaffert | ................. | H02B 1/03 200/51.09 |
| 5,435,755 A * | 7/1995 | Chien | ................... | H01H 85/26 337/198 |
| 6,267,608 B1 * | 7/2001 | Yagi | ..................... | H01R 13/447 439/142 |
| 2001/0025773 A1 * | 10/2001 | Rane | ................... | H02B 11/127 200/50.21 |
| 2017/0237238 A1 * | 8/2017 | Bastian | ................... | H02B 1/21 439/121 |

* cited by examiner

*Primary Examiner* — Gary Paumen
(74) *Attorney, Agent, or Firm* — Squire Patton Boggs US LLP

(57) ABSTRACT

A serviceable busway plug includes a main body with a main face and two sides, a window, a lever connected to either the main face or the sides, and at least one contact connected to the main body. The contact is configured to electrically connect to a busway.

20 Claims, 4 Drawing Sheets

BUSWAY PLUG INSPECTION WINDOW

CROSS-REFERENCE TO RELATED APPLICATION

This application claims priority to U.S. Provisional Patent Application No. 62/456,924, filed on Feb. 9, 2017. The disclosure of the provisional application is incorporated by reference herein in its entirety.

FIELD OF INVENTION

The present disclosure relates to serviceable busway plugs. More specifically, the present disclosure relates to serviceable busway plugs having windows for observing internal electrical connections.

BACKGROUND

Busway installations consist of several pieces of bus duct that are connected together with bridge joints. Along the busways, serviceable busway plugs (also referred to as "serviceable plugs") are provided to enclose electrical connections between the phases of a busway and downstream electrical equipment that draw power from the busway phases. The serviceable plug often incorporates additional protection devices, primarily of the fusible or breaker variety. This allows for additional protection and control of downstream equipment. Serviceable busway plugs allow for end users to make connections inside of the busway plug housing, to customize the wiring.

Serviceable busway plugs are typically made of metal, and contain no windows. Thus, they prevent a user from easily observing the connections contained within the serviceable plug. To safely observe the connections, for diagnostic or other purposes, a user must typically shut down power to the entire busway, all of the end devices powered through the busway plug in question (and often those adjacent on the same busway), don a protective suit, and then open the busway plug. This process is inefficient because it requires a user to shut down all equipment prior to opening the serviceable busway plug, leading to downtime.

The structure of busway plugs is strictly regulated by standards-setting organizations within the electrical power distribution industry. No approved serviceable busway plugs on the market include a window on a main body thereof, because the inclusion of windows typically reduces the strength of the plug. A need exists for a serviceable plug that allows observation of the connections contained within the serviceable plug, while providing sufficient structural integrity.

SUMMARY

In one embodiment, a serviceable busway plug includes a main body having a main face and two sides, a window disposed on the main body, a hook disposed on the main body configured to lock with a busway, a lever connected to one of the main face or one of the two sides, and at least one contact connected to one of the portions of the main body. The contact is configured to electrically connect to a busway. The lever is configured to open or close an electrical connection with the contact, and further configured to cause the hook to slide transversely relative to the main body.

The window may further include a bezel. The window may be bolted onto the top portion of the main body of the serviceable busway plug. The window may be made of a visually translucent material such as glass or transparent composite material. The lever may include an external indicator that indicates when the electrical connection is open or closed. The at least one contact may be configured to electrically connect to a separate phase of a busway. The lever may be configured to selectively electrically connect the at least one contact to a fuse switch, fuse, or breaker located within the main body of the serviceable busway plug. The main body may further be configured to receive one or more power cables connected to equipment.

In another embodiment, a method for checking an electrical connection within a serviceable busway comprises the steps of: providing a serviceable busway plug having at least one electrical connection and configured to connect to a busway, wherein the serviceable busway plug has a transparent portion on one surface thereof. The method further includes a step of observing the electrical connection through the transparent portion of the serviceable busway plug, wherein the electrical connection within the serviceable busway plug is closed during the step of observing.

The serviceable busway plug of this embodiment may further include a lever configured to energize the electrical connection, and during the step of observing the lever may be configured to permit power transfer to the electrical connection. During the step of observing, the serviceable busway plug may be sealed from the outside environment. The serviceable busway plug may further be configured to draw power from the busway via a plurality of contacts. The serviceable busway plug may include a hook engaged with the busway during the step of observing.

In a further embodiment, a serviceable busway plug is used with a busway and a power cable, and comprises a main body having a main face and two sides, a window disposed on the main body and configured to allow an observer to see an entire electrical connection between the busway and the power cable without opening the serviceable busway plug.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
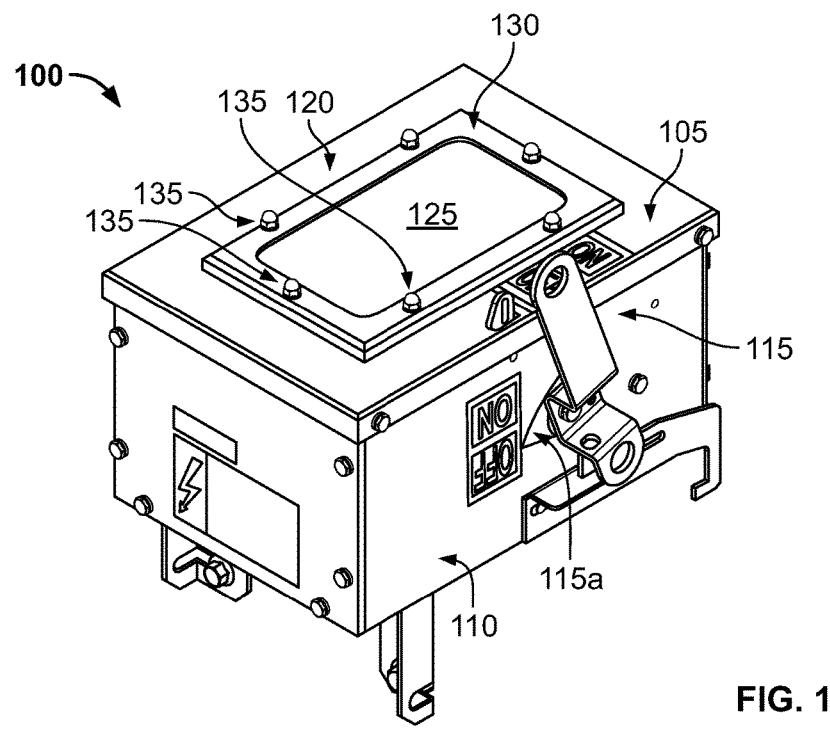
FIG. 1 is an isometric view of a serviceable busway plug according to an embodiment of the present disclosure.

FIG. 1 is an isometric drawing of a serviceable plug 100 having a main body defined by a main face 105 and a plurality of side surfaces 110, according to an embodiment of the present disclosure. Lever 115 is located on a side surface 110 in the embodiment of FIG. 1, and is connected to electrical connections located within the main body of serviceable plug 100. Window 120 includes a central section 125 made from a transparent material, such as glass, and a metal bezel 130 extending around a periphery of the central section 125. Window 120 in this embodiment is bolted onto a main face of service plug 105 using six bolts 135 extending through the metal bezel 130. Although not shown in FIG. 1, the interface between the viewing window 120 and main face of service plug 105 can include a liner to seal the interior of serviceable plug 100.

The serviceable plug 100 in this embodiment contains "on" and "off" decals, to indicate when lever 115 is in an on or off position, as shown in FIG. 1. In alternative embodiments (not shown), these decals can be omitted.

In alternative embodiments (not shown), greater or fewer bolts may be used to fix the window 120 to the main face 105 of the serviceable plug 100, such as seven or four bolts, for example. In other alternative embodiments (not shown), the window can be fixed to the main face of the serviceable plug via alternative methods other than a bolted interface, such as welding, using a stud and nut interface, adhesion bonding, interface fitting, or riveting. In still other alternative embodiments (not shown), the window can be made integral with the main face of the serviceable plug instead of bolted thereon.

Serviceable plug 100 contains internal connections between the phases of a busway and power cables for equipment (not shown). These internal connections are contained within the main body of serviceable plug 100, and include a switch (not shown) that provides an electrical connection between the busway and power cable connections. The equipment power cables are inserted into the main body of serviceable plug 100 through one or more holes (not shown) in a surface of serviceable plug 100. The holes may be pre-fabricated in a surface of the main body, or they may be drilled into the surfaces as needed. The holes are further insulated from the outside environment.

Through the window 120, an observer can readily observe the electrical connections within the serviceable busway plug 100 between each power cable and a phase of a busway while the electrical connections are actively conducting electricity. An observer can make these observations without opening the serviceable busway plug 100, thus improving safety and ease of use. Without window 120, to safely check the electrical connections an observer would have to power down the downstream equipment prior to opening the serviceable busway plug, which causes delay and leads to down time of the equipment. Optionally, a fuse switch, fuse, or breaker may also be included between a power cable and busway phase, to protect the equipment from electrical surges. In this arrangement, the lever 115 would be configured to open or close an electrical connection between the contact and the fuse switch (or between the fuse switch and power cable) within the main body of the serviceable busway plug using a linkage. The user also has the ability to inspect internal linkages, switch position, and possible fuse indication (whether the fuse is blown/open).

While serviceable plug 100 is described according to the orientation shown in FIG. 1, the serviceable plug is not limited to that particular orientation, and can be oriented in other orientations without departing from the scope of the present disclosure.

Window 120 in this embodiment is made from a visually translucent material such as glass or transparent composite material. In one embodiment, the window 120 is constructed of a ¼ inch thick AS2 clear laminated safety glass with epoxy sealed edges housed in a metallic frame, and incorporates a gasket for sealing. In alternative embodiments (not shown) the window can be constructed of thicker or thinner glass (for example, either ⅛ inch thick glass or ½ inch thick glass), other grades of glass (including tinted, tempered, solid/laminated construction, etc.), and other transparent composite material (for example, acrylic, polycarbonate, etc.).

Figure 2:
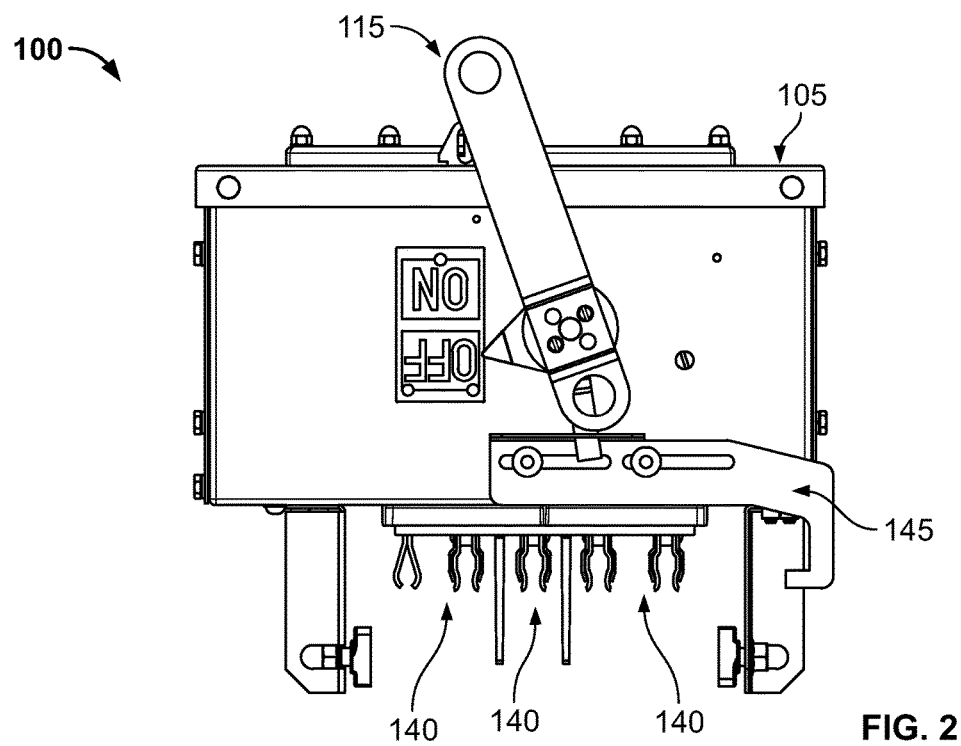
FIG. 2 is a side view of the serviceable busway plug of FIG. 1.

Window 120 in the FIG. 2 embodiment has been designed to provide a user with a viewing area sufficient for optical inspection of the device. The material for window 120 has further been selected to be robust enough to meet testing standards for the enclosure application, including endurance testing, thermal performance testing, and short circuit testing for the internal devices.

FIG. 2 shows a side-view of the serviceable plug 100. The serviceable plug 100 includes a plurality of contacts 140 extending from a surface opposite the main face 105 of the serviceable plug 100. The contacts 140 are configured to connect with the lines on a busway when the serviceable plug 100 is installed. In the illustrated embodiment, five contacts 140 are provided that connect to five separate lines on a busway. In alternative embodiments (not shown), greater or fewer contacts may be provided, such as six or three.

The electrical connection between the busway and electrical equipment can be opened or closed using lever 115 located on side surface 110. Lever 115 is connected to the internal switch inside the serviceable box main body that toggles an electrical connection for the internal connections. Lever 115 includes an external indicator 115*a* that corresponds with the decals on side surface 110, to indicate whether the electrical connections within the serviceable plug 100 are conducting electricity or not.

Figure 3:
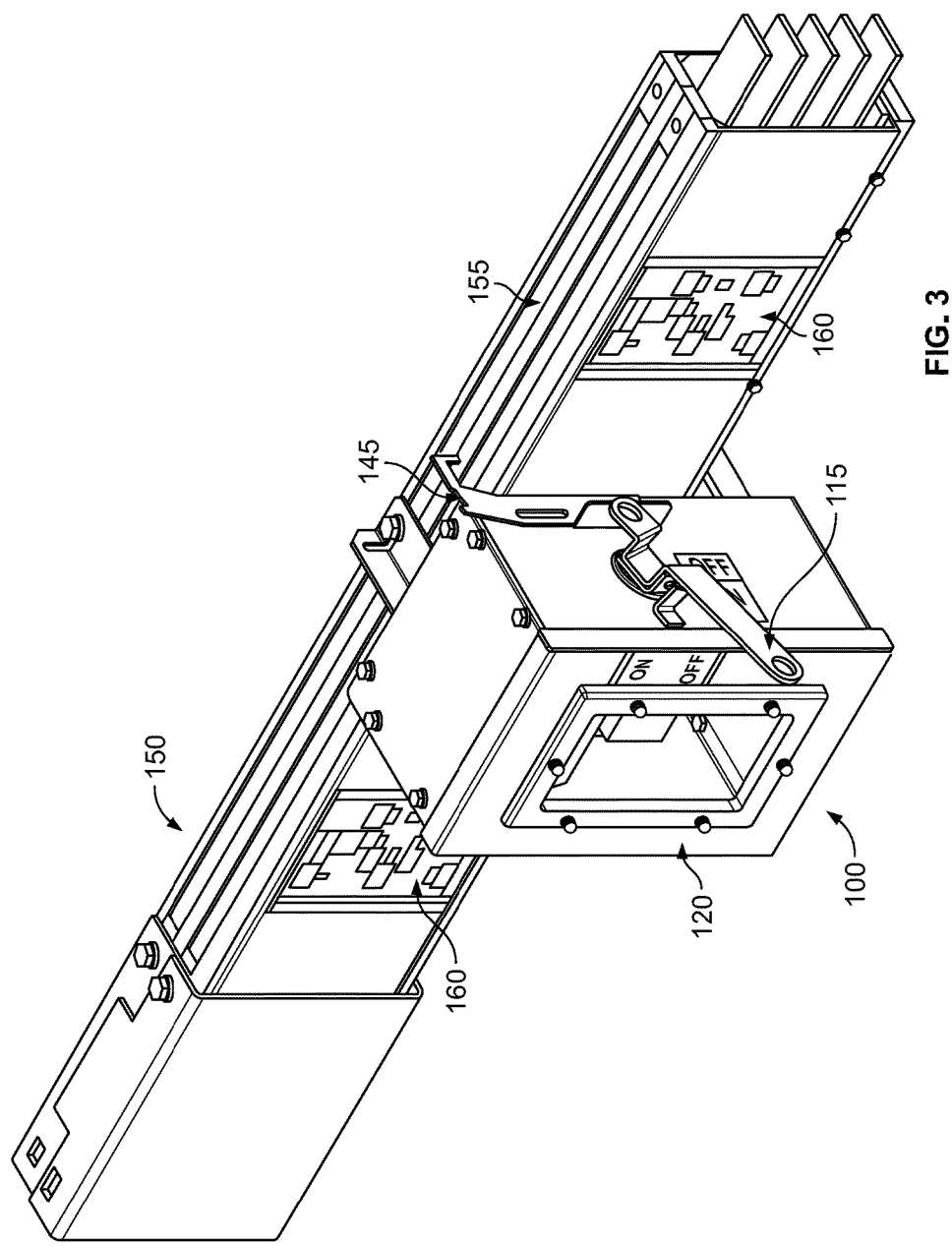
FIG. 3 is an isometric view of the serviceable busway plug of FIG. 1, installed on a busway.

FIG. 3 shows an isometric view of a serviceable plug 100 installed on a busway 150. As can be seen from this view, when lever 115 is in the "off" position, hook 145 is spaced from a trench 155 of busway, seen in FIG. 3. When lever 115 is moved to the "on" position, a linkage connected to lever 115 causes hook 145 to slide transversely relative to the main body, and engage with trench 155 of busway, locking the service plug in place and preventing removal of the plug while the lever 115 is in the "on" position. In alternative embodiments (not shown), the hook can be rotatable relative to the main body, and rotates when lever is pulled.

Hook 145 engages with trench 155 of busway 150 when lever 115 is moved to an "on" position. Busway 150 further includes a plurality of plug stations 160, where contacts 140 of serviceable plug 100 can engage with the phases of busway 150 when installed. In the present embodiment, three plug stations 160 are provided on busway 150. However, in alternative embodiments (not shown), a greater or fewer number of plug stations may be included on a busway, for example four or two plug stations.

With reference to FIGS. 1 and 3, a user may observe the electrical connections between a busway and power cables through window 120, to confirm whether an electrical connection is open or closed. A conventional serviceable busway plug lacks such a window, and it is necessary for a user to power down the entire busway, all of the end devices powered through the serviceable plug in question (and often those adjacent on the same busway), and don a service suit prior to opening the serviceable plug in order to safely observe the connections within the plug. Even when the lever 115 appears to be in the off position, it may still be desirable for a user to confirm that the electrical connections are open through window 120, for safety purposes. This method is in line with the best maintenance practices in the industry, compliant with the National electrical Manufacturers Association (NEMA) specification BU1.1 (as of January 2017). With window 120, a user can observe the connections and fuses (or breakers) contained within main body of serviceable plug 100 without needing to power-down the electrical equipment and don a service suit.

Figure 4:
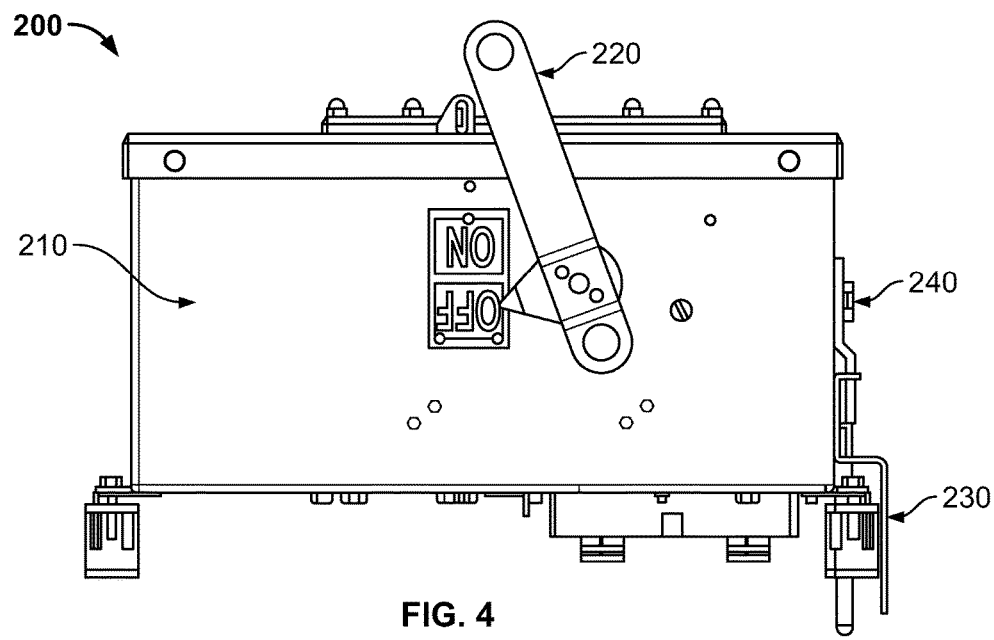
FIG. 4 is a side view of a serviceable busway plug according to another embodiment of the present disclosure.
Figure 5:
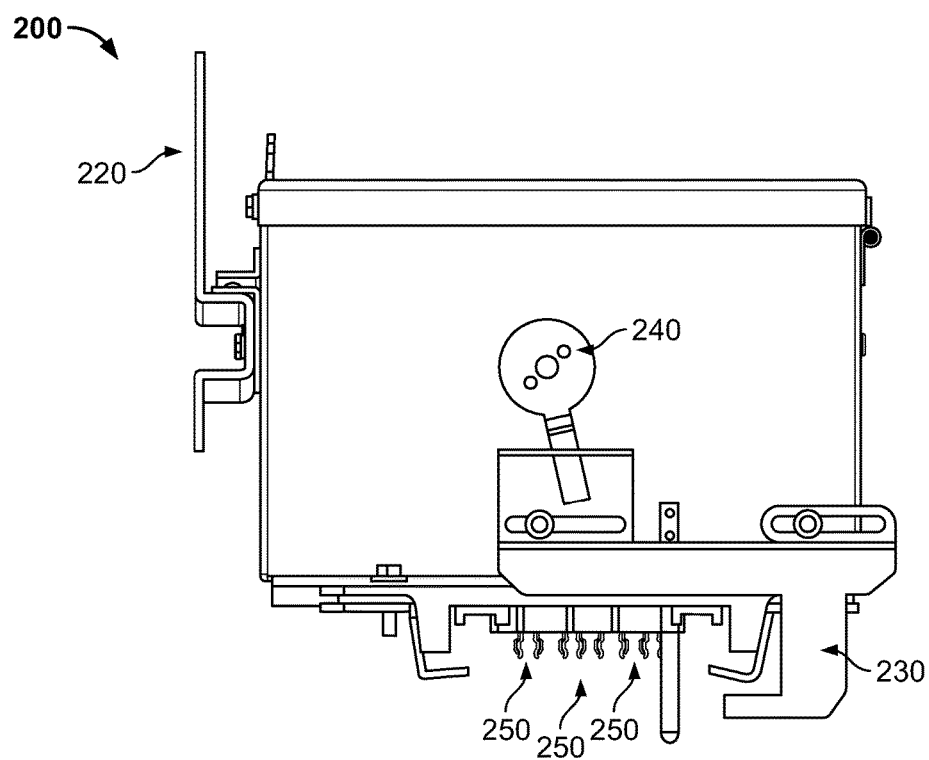
FIG. 5 is a side view of the serviceable busway plug of FIG. 4.
Figure 6:
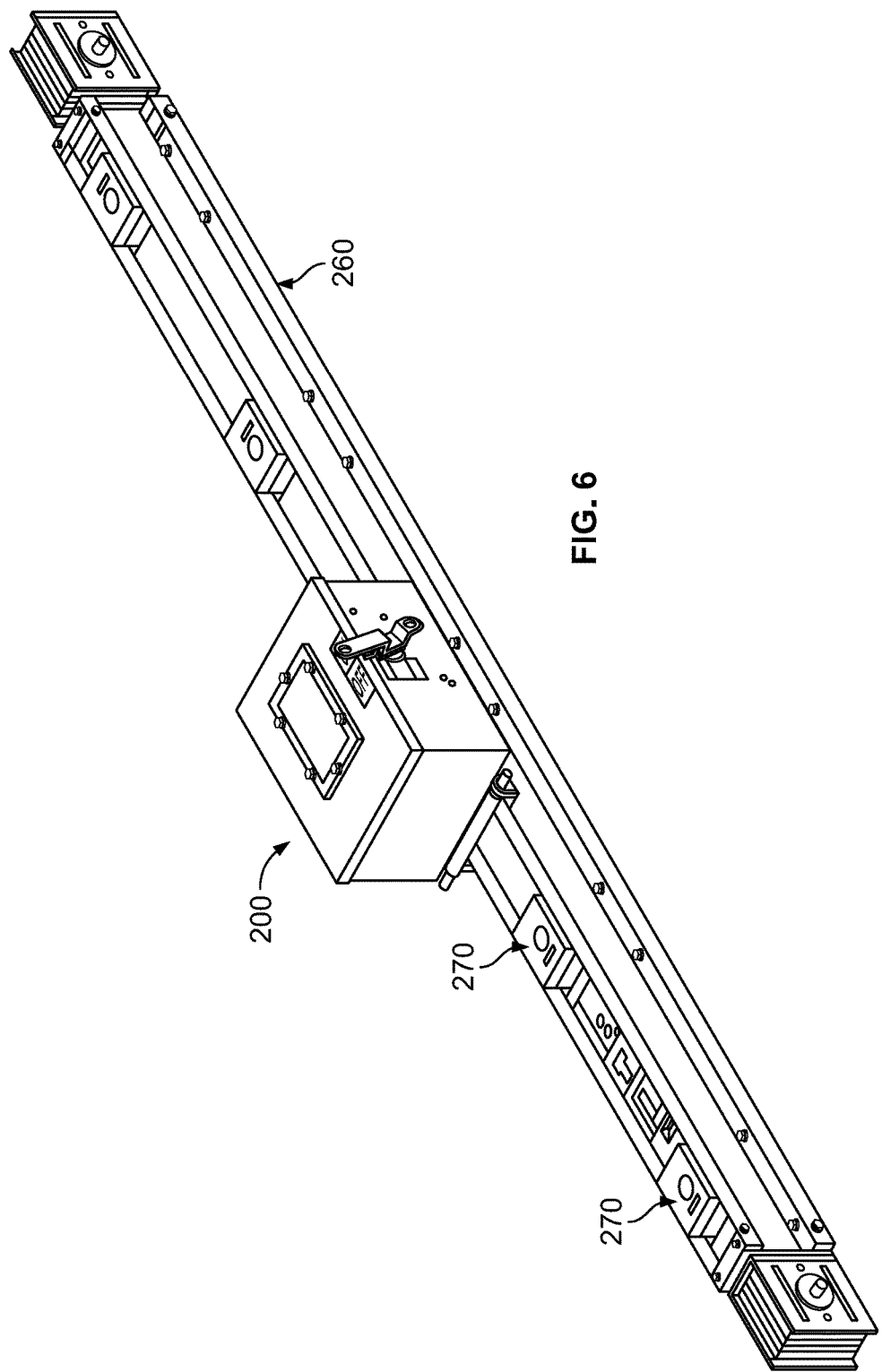
FIG. 6 is an isometric view of the serviceable busway plug of FIG. 4, installed on a busway.

FIGS. 4, 5, and 6 illustrate another embodiment of a serviceable plug 200 with a window 210. Serviceable plug 200 is designed to be installed on a busway such that lever 220 is oriented in parallel with the busway. Serviceable plug 200 includes a hook 230 located on a different side of the serviceable plug 200 than the lever 220. Hook 230 is connected to lever 220 via a linkage internal to the main body of serviceable plug 200, but otherwise works in the same way as the hook depicted in FIGS. 1-3. The serviceable plug 200 further includes an alternative mount 240 for lever 220, to which a user can selectively attach the lever 220 for ergonomic or environmental fit purposes. Alternative mount 240 is directly connected to hook 230, and causes hook 230 to slide when a user moves lever 220. Contacts 250, best seen in FIG. 5, attach to the phases of busway 260 via one or more busway ports 270, shown in FIG. 6. Contacts 240 are shaped differently from contacts 140 of FIGS. 1-3, but otherwise operate in a similar manner. In all other respects, serviceable plug 200 operates in the same manner as serviceable plug 100 discussed above.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A serviceable busway plug, comprising;
   a main body having a main face and two sides;
   a window disposed on the main body;
   a hook disposed on the main body,
      wherein the hook is further configured to lock with a busway;
   at least one contact connected to the main body,
      wherein the contact is configured to electrically connect to a busway;
   a lever connected to one of the main face or one of the two sides,
      wherein the lever is configured to open or close an electrical connection with the contact, and
      wherein the lever is further configured to cause the hook to slide transversely relative to the main body.

2. The serviceable busway plug of claim 1, wherein the window includes a bezel.

3. The serviceable busway plug of claim 1, wherein the window is configured to allow an observer to see the entire electrical connection without opening the serviceable busway plug.

4. The serviceable busway plug of claim 1, wherein the window is made of a visually translucent material such as glass or transparent composite material.

5. The serviceable busway plug of claim 1, further including an external indicator attached to the lever, the external indicator configured to indicate when the electrical connection is open or closed.

6. The serviceable busway plug of claim 1, wherein the at least one contact is a plurality of contacts.

7. The serviceable busway plug of claim 6, wherein each one of the plurality of contacts is configured to electrically connect to a separate phase of a busway.

8. The serviceable busway plug of claim 1, wherein the main body is configured to receive one or more power cables electrically connected to equipment.

9. The serviceable busway plug of claim 8, wherein the lever is configured to selectively electrically connect the one or more power cables to a fuse switch or breaker located within the main body of the serviceable busway plug.

10. A method for checking an electrical connection within a serviceable busway plug, comprising the steps of:
   providing a serviceable busway plug containing at least one electrical connection enclosed within the serviceable busway plug and configured to connect to a busway,
      wherein the serviceable busway plug has a transparent portion on one surface thereof,
      wherein the serviceable busway plug includes a hook configured to be engageable with the busway,
      wherein the hook is configured to slide transversely relative to the busway;
   observing the electrical connection through the transparent portion of the serviceable busway plug,
      wherein the electrical connection within the serviceable busway plug is conducting electricity during the step of observing.

11. The method of claim 10, wherein the serviceable busway plug further includes a lever configured to toggle power to the electrical connection.

12. The method of claim 11, wherein during the step of observing, the lever is configured to permit power transfer to the electrical connection.

13. The method of claim 10, wherein during the step of observing, the serviceable busway plug is sealed from an outside environment.

14. The method of claim 10, wherein the serviceable busway plug is configured to draw power from the busway via a plurality of contacts.

15. The method of claim 10, wherein the serviceable busway plug includes a hook engaged with the busway during the step of observing.

16. A serviceable busway plug for use with a busway and a power cable, comprising;

a main body having a main face and two sides;

a window disposed on the main body and configured to allow an observer to see an entire electrical connection between the busway and the power cable without opening the serviceable busway plug.

17. The serviceable busway plug of claim 16, further comprising a hook configured to lock with the busway.

18. The serviceable busway plug of claim 16, further comprising a contact configured to electrically connect to the busway.

19. The serviceable busway plug of claim 16, wherein the window includes a metal bezel extending around a periphery of a transparent central section.

20. The serviceable busway plug of claim 19, wherein the metal bezel is bolted to the main body.

* * * * *